Dec. 7, 1965    K. EINFELD    3,222,521
METHOD AND APPARATUS FOR MEASURING
FISSIONABLE ISOTOPE CONCENTRATION
Filed Oct. 6, 1960    3 Sheets-Sheet 1

INVENTOR.
KLAUS EINFELD
BY
ATTORNEY

Dec. 7, 1965       K. EINFELD       3,222,521
METHOD AND APPARATUS FOR MEASURING
FISSIONABLE ISOTOPE CONCENTRATION
Filed Oct. 6, 1960                          3 Sheets-Sheet 3

*INVENTOR.*
KLAUS EINFELD
BY
*A. Fredrick Namann*
ATTORNEY

United States Patent Office 3,222,521
Patented Dec. 7, 1965

3,222,521
METHOD AND APPARATUS FOR MEASURING FISSIONABLE ISOTOPE CONCENTRATION
Klaus Einfeld, Hannover, Germany, assignor to Interatom, Internationale Atomreaktorbau G.m.b.H., Duisburg, Germany, a corporation of Germany
Filed Oct. 6, 1960, Ser. No. 60,821
Claims priority, application Germany, Oct. 17, 1959, I 17,124
12 Claims. (Cl. 250—83.1)

The present invention is directed to a method and apparatus for the non-destructive testing of fissionable material containing substances to determine the concentration of the fissionable material and more particularly to a method and apparatus for the determination of the concentration of two or more fissionable isotopes.

The knowledge of the content of $U^{235}$ and $Pu^{239}$ in fuel elements used for generating energy is of particular importance in determining burnup or breeding gains. Prior art methods of determining fissionable material concentrations have generally required either a measurement of the heat generated by beta and gamma radiation, from which heat quantity a conclusion as to concentration of fissionable material is drawn, or observing the decay of gamma radiation as a function of time to determine fissionable material content. Both of these methods result in an indication of total fissionable material concentration but do not provide a measure of the quantities of the individual fissionable materials present in the sample or substance. Therefore, if more than one fissionable material is present in the fuel, the prior art methods are unable to distinguish between them. Other methods are also known, such as radio-chemical analysis and mass spectrometrical measurements, but both of these methods require destruction of the sample or item to be investigated. Such destructive methods, although accurate, are undesirable since the cost of the sample destroyed in making the measurements may represent a substantial investment in fabrication costs.

The present invention is directed to overcoming these disadvantages of the prior art by providing a method and apparatus for the non-destructive testing of fissionable material containing substances or samples in which the relative concentration of the individual fissionable materials may be easily determined.

Therefore, it is the object of the present invention to provide a method and apparatus for the non-destructive testing and measurement of fissionable material containing substances.

It is a further object of the present invention to provide a method and apparatus for the non-destructive testing of fissionable material containing substances by irradiating with neutrons and measuring the prompt and/or delayed neutron resulting from the fission process.

It is a still further object of the present invention to provide a method and apparatus for the non-destructive testing of fuel elements, for example, in which the element is irradiated for short periods of time with neutrons having different energy spectrums, the number of spectrums being equal to the number of different fissionable materials to be measured.

It is another object of the present invention to provide a method and apparatus in which the relative concentration of a plurality of different fissionable materials is determined by irradiating with a plurality of neutron spectrums with different mean energies where the mean energy of the spectrum is chosen to correspond to a particular segment of the fission cross section curve for the particular fissionable material.

These and other objects of the present invention will be more apparent from the following detailed description and drawings, hereby made a part of the specification, in which.

Figure 1:
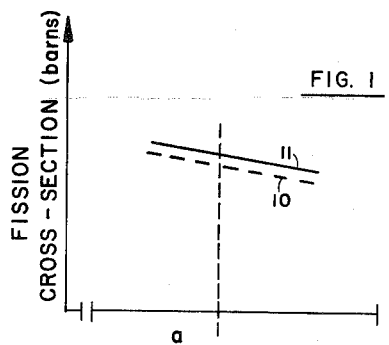
FIGURE 1 is a graph showing the fission cross section as a function of neutron energy of two fissionable materials in one energy range.

The method of the present invention is based upon the utilization of the differences in fission cross section of two or more fissionable isotopes, the concentration of which is to be measured. For the specific examples given herein $U^{235}$ and $Pu^{239}$ are used; however, the concentration of fissionable isotopes other than or in addition to these isotopes may be measured by the present method. Thus for $n$ fissionable material types, $n$ neutron spectrums are required, as is explained hereinafter in detail.

The requirement of the example is to determine by non-destructive methods the concentration of $U^{235}$ and $Pu^{239}$ of a fuel element which has been utilized in a reactor. The methods of the present invention, however, are also applicable to unirradiated samples or fuel elements.

The principle of the following methods is based upon the generation of a first neutron spectrum, and a second neutron spectrum having a mean energy different from the first spectrum. The determination of the number of fissions as a function of the neutron spectrum applied follows from the counting of the prompt and/or delayed neutrons produced by the fissions.

The two equations to be solved simultaneously are:
$$F_1 = A(N^{235} \cdot b^{235} \cdot {}_1\sigma^{235} + N^{239} \cdot b^{239} \cdot {}_1\sigma^{239})\phi_2 \quad (2)$$
$$F_2 = A(N^{235} \cdot b^{235} {}_2\sigma^{235} + N^{239} \cdot b^{239} \cdot {}_2\sigma^{239})\phi_2 \quad (2)$$

For the general case where $n$ number of isotopes are present and to be measured, $n$ number of equations are obtained from:
$$F_i = A(N'b'\sigma_i + N^2b^2\sigma^2_i + \cdots b^nN^n\sigma^n_i)\phi_i \quad (3)$$
Where
$$\sigma_i = \frac{\int \sigma(E) \cdot \phi_i(E) dE}{\int \phi_i(E) dE}$$

and where the number of measurements $F_i$ must be equal to the number isotope to be measured. Where $F_1$ and $F_2$ are the total counts detected, i.e., total prompt and/or delayed neutrons produced times the constant A as a result of irradiating with a first neutron flux, $\phi_1$ ($n$/cm.²/sec.), and a second neutron flux $\phi_2$, respectively. $N^{235}$ and $N^{239}$ are the unknown quantities of $U^{235}$ and $Pu^{239}$ or other fissionable material, and ${}_1\sigma^{235}$ and ${}_1\sigma^{239}$ are the average neutron cross section for fission of the $U^{235}$ and $Pu^{239}$ within the neutron energy range of $\phi_1$, while ${}_2\sigma^{235}$ and ${}_2\sigma^{239}$ are the average neutron cross section for fission of $U^{235}$ and $Pu^{239}$ within the energy range of $\phi_2$, $b^{235}$ and $b^{239}$ are the numbers of delayed neutrons per fission of $U^{235}$ and $Pu^{239}$, where A is a constant including detection efficiency and geometry, which is known. Thus, since ${}_1{}_1\sigma^{235}$, $\sigma^{239}$, ${}_2\sigma^{235}$, and ${}_2\sigma^{239}$ are known quantities (see BNL 325 and Supplement 1, second edition, entitled, "Neutron Cross Sections," U.S. Government Printing Office), and $b^{235}$ and $b^{239}$ are known quantities too (see "Reactor Physics Constants," ANL–5800, Argonne National Laboratory), $F_1$ and $F_2$ are measured and $\phi_1$ and $\phi_2$ are controlled in the present method, the only quantities not known are $N^{235}$ and $N^{239}$. By solving Equations 1 and 2 simultaneously, $N^{235}$ and $N^{239}$ are then determined.

Figure 2:
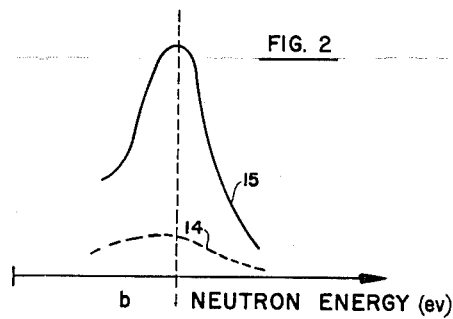
FIGURE 2 is a graph similar to FIGURE 1 for another energy range.
Figure 3:
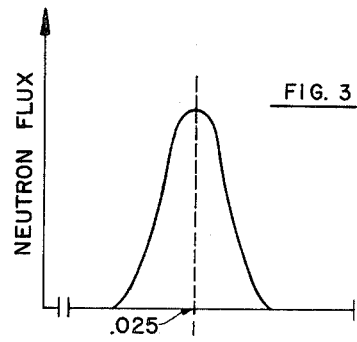
FIGURE 3 is a plot of neutron flux as a function of neutron energy showing a first neutron spectrum.
Figure 4:
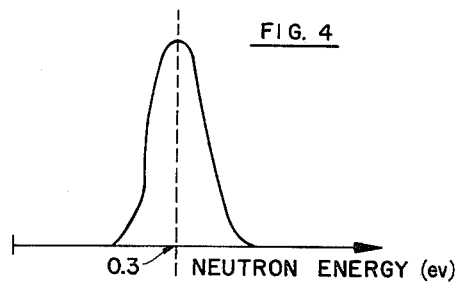
FIGURE 4 is similar to FIGURE 3 and shows a second neutron spectrum.
Figure 5:
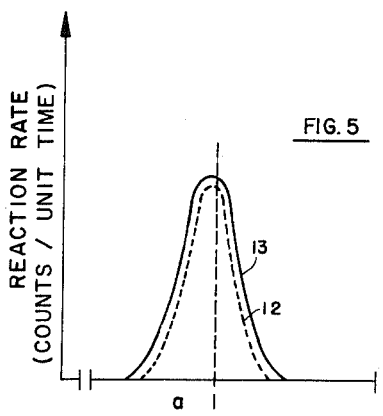
FIGURE 5 is a plot of the reaction rate as a function of neutron energy for the energy range of FIGURES 1 and 3.
Figure 6:
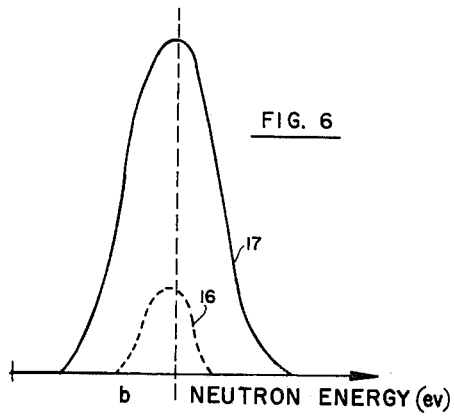
FIGURE 6 is a plot similar to FIGURE 5 for the energy range of FIGURES 2 and 4.

Thus, with the method of the present invention a first neutron flux, $\phi_1$, having an energy distribution as in FIGURE 3, i.e., a mean thermal energy (.025 e.v.), is passed into the sample to be tested. The neutron fission cross section (average) for the $U^{235}$ in the sample is shown by curve 10 of FIGURE 1, while the neutron fission cross section (average) for $Pu^{239}$ is shown by curve 11. The product of the neutron flux, $\phi_1$, the cross sections, $_1\sigma^{235}$, $_1\sigma^{239}$, and the number of $U^{235}$ and $Pu^{239}$ atoms are shown as curves 12 and 13 in FIGURE 5, respectively. The total counts, $F_1$, will be the sum of the two curves 12 and 13. A second neutron flux, $\phi_2$, preferably with a mean energy of 0.3 e.v. for this example (see FIGURE 4), is then passed into the same sample. The neutron fission cross section (average) for the $U^{235}$ in the sample for the energy range of $\phi_2$ is shown in FIGURE 2 as curve 14 and for $Pu^{239}$ as curve 15. The product of the neutron flux $\phi_2$, the cross section, $_2\sigma^{235}$, $_2\sigma^{239}$, and the number of $U^{235}$ and $Pu^{239}$ atoms are shown in curves 16 and 17 in FIGURE 6, respectively. The total counts $F_2$, will be the sum of these two curves 16 and 17.

The total counts $F_1$ and $F_2$ are measured by standard neutron detectors or fission counters and recorded as a total. This number may then be used to calculate the two unknown quantities $N^{235}$ and $N^{239}$ in Equations 1 and 2 by ordinary calculational methods, i.e., the solving of the two equations simultaneously.

Figure 7:
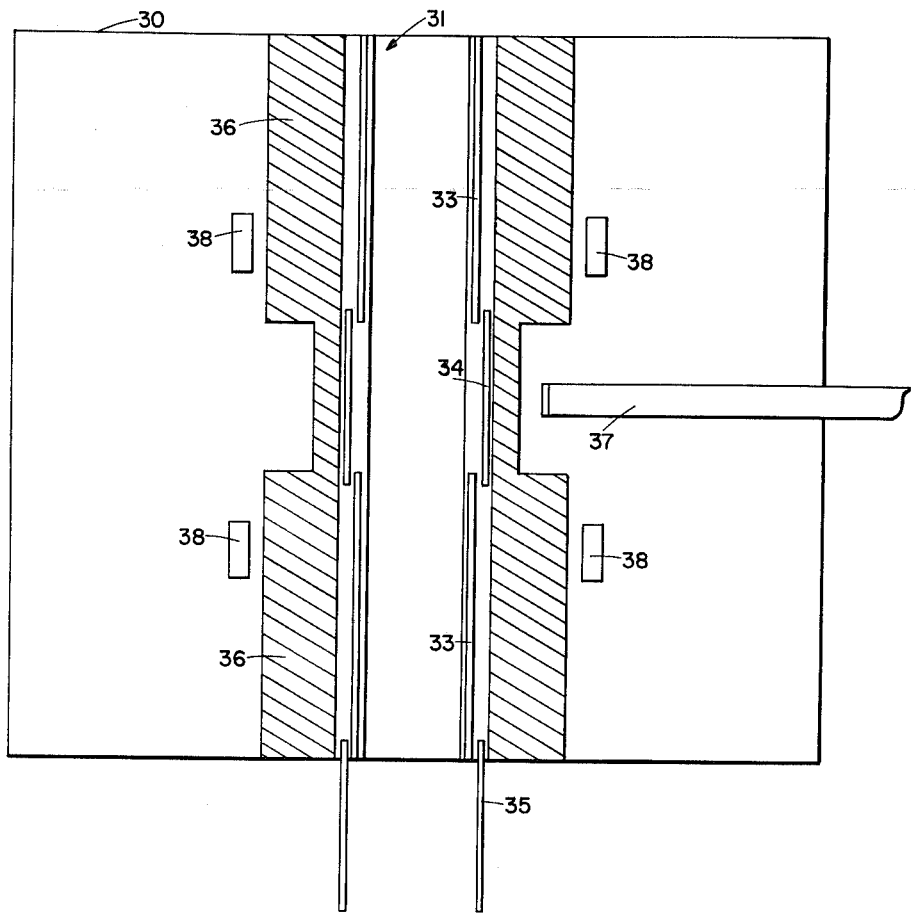
FIGURE 7 is a sectional view of the apparatus utilized in the present invention.

One apparatus for carrying out the method of the present invention is shown in FIGURE 7. A tank 30 filled with a neutron moderator, e.g., graphite, paraffin, etc., is provided with an opening 31 into which the fuel element or sample is placed. The fuel element is rotatably supported in the opening 31 and a means (not shown) is provided for rotating the element about the axis of opening 31. Concentric with and surrounding the opening 31 are a plurality of neutron filters fabricated of neutron absorbing material such as cadmium, boron, or other high neutron absorption cross section materials. These filters 33, 34, and 35 are movable longitudinally and are located between the opening 31 and the gamma ray shield 36. The shield 36 has a reduced diameter portion at its center adjacent to which is located a source 37 of neutrons, such as a tritium target bombarded by deuterons. Such neutron sources are well known in the art, see U.S. Patent 2,906,903. The neutron detectors 38, of which twelve are utilized, are located in two arrays around the opening 31 in the graphite moderator above and below the reduced diameter portion of the shield 36.

Figure 8:
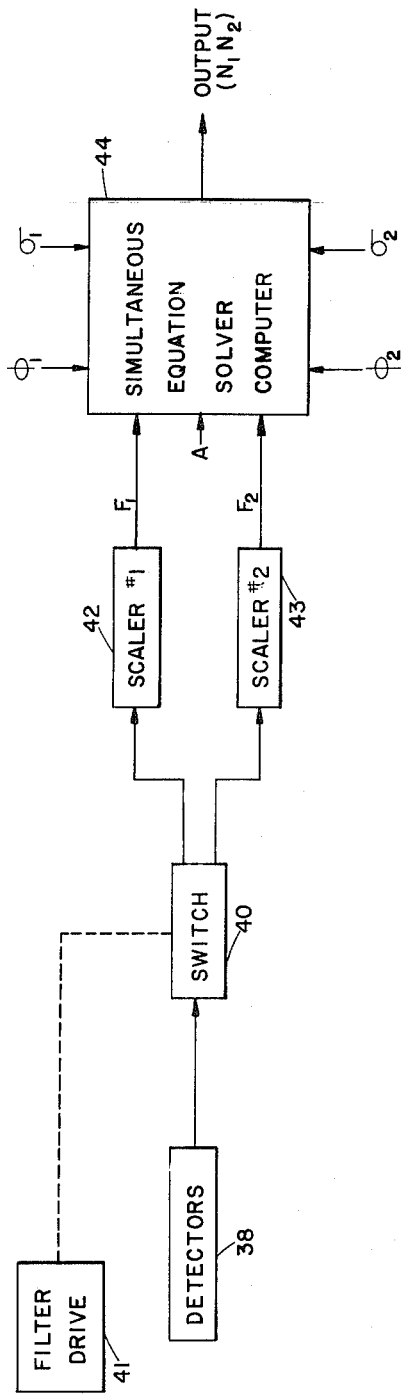
FIGURE 8 is a schematic diagram of the electrical circuit utilized in the present invention.
Figure 9:
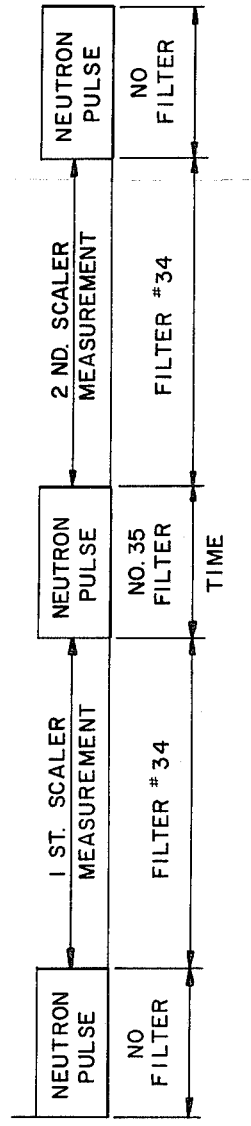
FIGURE 9 is a time plot of the operation of the apparatus shown in FIGURES 7 and 8.

The detectors 38 have their output connected to a switch 40 (see FIGURE 8) which is mechanically connected to a filter drive 41 which drive moves the filters 33–35 into and out of position adjacent the neutron source 37. The switch 40 connects the detectors 38 to a first scaler 42 or a second scaler 43 depending upon which filter is in operative position adjacent the source 37. The scalers 42 and 43 have their outputs connected to a computer 44 into which the values for $\phi_1$, $\phi_2$, $_1\sigma$ and $_2\sigma$ are preset and which receives periodically, or continuously with information storage, the values $F_1$ and $F_2$ from scalers 42 and 43. The computer 44 is a standard simultaneous equation solver well known in the art, and is not required if ordinary computational techniques are utilized, i.e., if the output of the scalers 42 and 43 is read and computations made by hand.

The operation of this apparatus is as follows: A fuel element or other sample which is to be tested is placed in the opening 31 and is preferably rotated at any desired speed. The neutron source 37 is activated for a short period of time, i.e., a few (5) seconds, with no filter in position around that portion of the fuel element which is being tested, i.e., the portion adjacent the neutron source. Neutron filter 33 is permanently supported in the position shown to ensure that thermal neutrons are screened from the upper and lower portions of the fuel element which are not being tested and is made of a material or materials having high thermal neutron cross sections. Filters 34 and 35 are removed from the area of the test section 41. The neutron source is deactivated and filter 34, preferably made of cadmium, is inserted. During the time filter 34 is around test section 41, the position shown in FIGURE 7, the delayed neutrons are counted by detector 38 and recorded by the first scaler 42. This counting is continued for several minutes. Filter 34 is then removed and filter 35 is inserted. The neutron source is activated and a neutron spectrum with an average energy of from 0.25 to 0.35 e.v. is created. The spectrum results from the high absorption of low energy neutrons by the material, preferably gadolinium, of filter 35. After irradiation of the fuel element section with this epithermal neutron spectrum for a few (5) seconds, the filter 35 is removed and filter 34 is inserted. The delayed neutrons are again counted by detectors 38 and are now recorded on the second scaler 43 since the switch 40 is activated by the filter drive 41 to sequentially switch between the first and second scalers 42 and 43. This procedure may then be repeated a number of times until enough counts are obtained for the desired statistical accuracy. The recorded counts on the scalers may then be fed to the computer 44, or the computer may continuously receive the information for storage, or the calculations may be made by hand. In any event, the result obtained by the substitution of the now known values in Equations 1 and 2, or the general case of Equation 3, and the simultaneous solution thereof is a measurement of the concentration of $U^{235}$ and $Pu^{239}$ by non-destructive methods.

The above-described method is referred to herein as the screening-off method. Other methods, such as boron poisoning method, slowing down time method, and chopper method, also utilize the steps of the present invention and are described hereinafter.

The boron poisoning method utilizes a pulse of thermal and epithermal neutrons, generated by any known technique, i.e., chopper or accelerator, of a few seconds duration, e.g. 5 seconds. The neutrons are passed into a tank of a water solution of boron acting as a moderator in which the sample to be tested has been placed. The Wigner-Wilkins spectrum in the moderator is known and the fission cross section for $U^{235}$ and $Pu^{239}$ as a function of the boron concentration is also known (see WAPD–185). A measurement, by standard techniques, is made of the delayed neutrons after the neutron pulse is turned off. A second burst of neutrons with a different boron concentration in the moderator is used and the delayed neutrons again measured. The values are substituted in Equations 1 and 2 which are then solved simultaneously for $U^{235}$ and $Pu^{239}$ concentration. Thus two bursts of neutrons having different neutron spectrums by virtue of the boron concentration change are used to irradiate a sample, delayed neutrons are then measured, i.e., neutrons created by the fissionable material, and concentration of the fissionable material is determined.

The slowing down method utilizes the characteristic that a burst of fast neutrons in heavy moderator (i.e., not hydrogen) will decrease in energy as a function of time, i.e., the slowing down time is directly proportional to $1/\sqrt{E}$, where E is the neutron energy. Thus at some time $t$ after the burst the fast neutrons will have a mean energy less than fast, e.g. ~30 $\mu$sec. after the burst the mean energy will be 0.3 e.v. in a graphite moderator. In this method the pulse of fast neutrons is applied to a heavy moderator in which the fuel element is placed. The counting rates of prompt neutrons are measured after slowing down times corresponding to energies of 0.3 e.v. and 0.025 e.v. Thus neutrons of two different neutron spectrums are used to irradiate a sample and the rate of neutrons created by the fissionable material is measured, and concentration of the fissionable material is determined.

Other apparatus for carrying out the method of the present invention could include the use of a nuclear reactor in which a beam of neutrons is filtered by neutron choppers to obtain a desired neutron spectrum, i.e., the chopper method. Thus for the thermal neutron spectrum utilized, one of the irradiations of the sample in the present invention could be the neutron spectrum available at a standard thermal column. The second spectrum could be obtained by passing a beam of neutrons through two connected choppers separated by about one meter so that neutrons having an energy range of from 0.25 to 0.35 e.v. are obtained for irradiating the sample. The prompt and/or delayed neutrons are then measured. In the use of apparatus of this type the use of filters and moderator surrounding the sample is unnecessary. The use of choppers for obtaining selected energy neutrons is well known.

In all the variations of the present method mentioned above neutron spectrums of 0.025 and 0.3 e.v. have been specified. These energies were selected because the fissionable materials utilized in the various examples have particularly desirable fission cross sections at these energies. However, other energy spectrums may be utilized, i.e., epithermal and fast, thermal and fast, fast and fast (when the isotope is fissionable essentially only by fast neutrons, e.g. $U^{238}$ and $Th^{232}$), and the number is not limited, except that there must be at least two neutron energy spectrums of different mean value. If extreme accuracy is required, the method may be repeated numerous times utilizing two different spectrums, or six or a dozen different neutron spectrums may be utilized, the fundamental requirement of the present invention being merely irradiating a sample containing two different fissionable materials with at least two different neutron spectrums and determining concentration in accordance with Equation 3.

Although a particular embodiment of the present invention has been described, various modifications will be apparent to those skilled in the art. Therefore, the present invention is not limited to the specific embodiment described but only by the appended claims.

What is claimed is:

1. A non-destructive method for measuring the concentration of at least two fissionable isotopes of elements selected from the group consisting of thorium, uranium and plutonium in a sample comprising the steps of irradiating the sample with a plurality of neutron spectrums, said number of neutron spectrums being equal to the number of fissionable isotopes to be measured, each of said neutron spectrums having a different average energy, sequentially counting after each irradiation the number of fissions resulting from each irradiation, and comparing each of said counts as a function of the fission cross section of the isotope for the particular average energy of each neutron spectrum.

2. A non-destructive method for measuring the concentration of at least two fissionable isotopes of elements selected from the group consisting of thorium, uranium and plutonium in a sample comprising the steps of sequentially irradiating the sample with a plurality of neutron spectrums, said number of neutron spectrums being equal to the number of fissionable isotopes to be measured, each of said neutron spectrums having a different average energy, sequentially counting after each irradiation the number of fissions resulting from each irradiation, and comparing said counting in accordance with the relationship $$F_i = A(N'b'\sigma_i' + N^2 b^2 \sigma_i^2 + \ldots b^n N^n \sigma_i^n)\phi_i$$

where $$\sigma_i = \frac{\int \sigma(E) \cdot \phi_i(E) dE}{\int \phi_i(E) dE}$$

$i$=integer values,
$F_i$=the number of counts resulting from one irradiation,
$A$=a constant,
$N^1$=number of atoms of first fissionable isotope,
$N^n$=number of atoms of $n$th fissionable isotope,
$\sigma_i^1$=cross section of first fissionable isotope (average value) for spectrum of first average value,
$\phi_i$=neutron flux (neutrons/cm.$^2$/sec.).

3. A non-destructive method for measuring the concentration of at least two fissionable isotopes of elements selected from the group consisting of thorium, uranium and plutonium in a sample comprising the steps of irradiating said sample with a neutron spectrum of a first average energy for a period of time, counting at least a portion of the neutrons created by the fissionable isotopes, irradiating said sample with a neutron spectrum of a second average energy different from the first, counting at least a portion of the neutrons created by the said fissionable isotope, and comparing the first counts with the second counts as a function of the fission cross section of the isotopes for the particular spectrum energy.

4. The method of claim 3 wherein said neutrons counted are delayed neutrons.

5. The method of claim 3 wherein said neutrons counted are prompt neutrons.

6. The method of claim 3 wherein said neutron spectrum of a first average energy is a thermal neutron spectrum.

7. The method of claim 3 wherein said neutron spectrum of a second average energy is an epithermal neutron spectrum.

8. The method of claim 3 wherein said first and second irradiations are produced by passing a fast neutron beam through a boron-containing moderator and varying the boron concentration to obtain at least two different average neutron energies.

9. The method of claim 3 wherein said first and second irradiations are produced by passing a burst of fast neutrons through a heavy moderator and said counting is done at two predetermined times after said burst.

10. The method of claim 3 wherein said first irradiation is a thermal neutron spectrum and said second irradiation is produced by passing a beam of neutrons through a neutron selector to obtain an average neutron energy other than thermal.

11. A non-destructive method for measuring the concentration of two fissionable isotopes of elements selected from the group consisting of thorium, uranium and plutonium in a sample comprising the steps of irradiating the sample with a first neutron spectrum having an average neutron energy in the thermal range, counting the delayed neutrons resulting from the irradiation of both fissionable isotopes, irradiating the sample with a second neutron spectrum having an average energy greater than thermal, counting the delayed neutrons resulting from the irradiation of both fissionable isotopes, said second neutron spectrum energy being selected in a range where the average fission neutron cross section of at least one of said two fissionable materials is different from the average fission neutron cross section at the first energy, and comparing the counts resulting from the irradiations with the first and second energy neutrons as a function of the average fission cross section for the particular spectrum.

12. A non-destructive method for measuring the concentration of $U^{235}$ and $Pu^{239}$ in a sample comprising the steps of irradiating said sample with a neutron spectrum having an average neutron energy in the thermal range, counting the delayed neutrons emitted by said $U^{235}$ and Pu$^{239}$, irradiating the samples with a second neutron spectrum having an average energy of about 0.3 e.v., counting the delayed neutrons resulting from the second irraper sq. cm. per second, and N$^{235}$ and N$^{239}$ are the relationships:

$$F_1 = A(N^{235}b^{235}{}_1\sigma^{235} + N^{239}b^{239}{}_1\sigma^{239})\phi_1$$
$$F_2 = A(N^{235}b^{235}{}_2\sigma^{235} + N^{239}b^{239}{}_2\sigma^{239})\phi_2$$

where $F_1$ and $F_2$ are the first and second counts, A is a constant, $_1\sigma^{235}$ and $_1\sigma^{239}$ are the average fission cross sections for U$^{235}$ and Pu$^{239}$ in the thermal range, $_2\sigma^{235}$ and $_2\sigma^{239}$ are the average fission cross sections for U$^{235}$ and Pu$^{239}$ at about 0.3 e.v., $b^{235}$ and $b^{239}$ are the numbers of delayed neutrons per fission of U$^{235}$ and Pu$^{239}$, $\phi_1$ and $\phi_2$ are the first and second neutron fluxes in neutrons per sq. cm. per second, and N$^{235}$ and N$^{239}$ are the quantities determined.

References Cited by the Examiner

UNITED STATES PATENTS

| | | | |
|---|---|---|---|
| 2,206,634 | 7/1940 | Fermi et al. | 250—83.1 |
| 2,543,676 | 2/1951 | Thayer et al. | 250—83.6 |
| 2,551,449 | 5/1951 | Menke | 250—83 |
| 2,705,289 | 3/1955 | Youmans | 250—83.6 |
| 2,707,555 | 5/1955 | Gaudin | 250—83.1 |
| 2,712,081 | 6/1955 | Fearon et al. | 250—83.1 |
| 2,744,199 | 5/1956 | Juterbock et al. | 250—43.5 |
| 2,769,096 | 10/1956 | Frey | 313—61 |
| 2,845,544 | 7/1958 | Seaborg et al. | 250—83.1 |
| 2,931,761 | 4/1960 | Hurvitz | 250—83.1 |
| 2,966,590 | 12/1960 | Dunham | 250—83.1 |
| 2,969,307 | 1/1961 | Fermi et al. | 250—83.1 |
| 2,971,094 | 2/1961 | Tittle | 250—83.1 |
| 2,979,618 | 4/1961 | Richard | 250—83.1 |
| 2,996,618 | 8/1961 | Goodman et al. | 250—83.6 |
| 3,004,160 | 10/1961 | Tittle | 250—83.6 |
| 3,011,056 | 11/1961 | Gale | 250—71.5 |
| 3,018,374 | 1/1962 | Pritchett | 250—71.5 |
| 3,050,624 | 8/1962 | Janner | 250—83.1 |

OTHER REFERENCES

Foote, Jr.: "Neutron Scattering Cross Section of U235," Physical Review, vol. 109, No. 5, March 1, 1958, pages 1641–1644.

RALPH G. NILSON, *Primary Examiner.*

ARTHUR GAUSS, *Examiner.*